United States Patent

[11] 3,561,484

| [72] | Inventor | John F. Taplin<br>15 Sewall St., West Newton, Mass. 02165 |
|---|---|---|
| [21] | Appl. No. | 857,599 |
| [22] | Filed | Sept. 12, 1969 |
| [45] | Patented | Feb. 9, 1971 |
| | | Continuation of application Ser. No.<br>564,383, July 11, 1966, now abandoned. |

[54] SERVO-CONTROLLED DUAL FLUID MIXING VALVE
7 Claims, 1 Drawing Fig.

[52] U.S. Cl. ................................... 137/625.4,
137/90; 236/12
[51] Int. Cl. ................................................. F16k 11/00
[50] Field of Search............................ 251/25, 31;
137/90, 625.4, 625.27, 625.66; 236/12A

[56] References Cited
UNITED STATES PATENTS

| 1,819,045 | 8/1931 | Snedikel................ | 236/12 |
| 2,449,766 | 9/1948 | Brown.................... | 137/90X |
| 824,546 | 6/1906 | Junggren............... | 251/30X |
| 2,550,907 | 5/1951 | Brown.................... | 236/12A |
| 2,577,967 | 12/1951 | Hughes................... | 251/25 |
| 3,043,335 | 7/1962 | Hunt...................... | 137/625.66 |
| 3,316,938 | 5/1967 | Frooseev et al......... | 137/625.66 |
| 3,326,239 | 6/1967 | Saint-Joanis et al.... | 137/625.66 |

FOREIGN PATENTS

| 1,273,005 | | France ................. | 137/625.66 |

Primary Examiner—William R. Cline
Attorney—Erwin Salzer

ABSTRACT: A servo-controlled mixing valve for mixing two fluids in a variable ratio is operated by a fluid motor having fluid admission means and fluid dumping means which are jointly controlled by dual action servo-valve means, the effective area of the fluid admission means and of the fluid dumping means being changed inversely and simultaneously by operation of a common valve stem under the control of a sensing element.

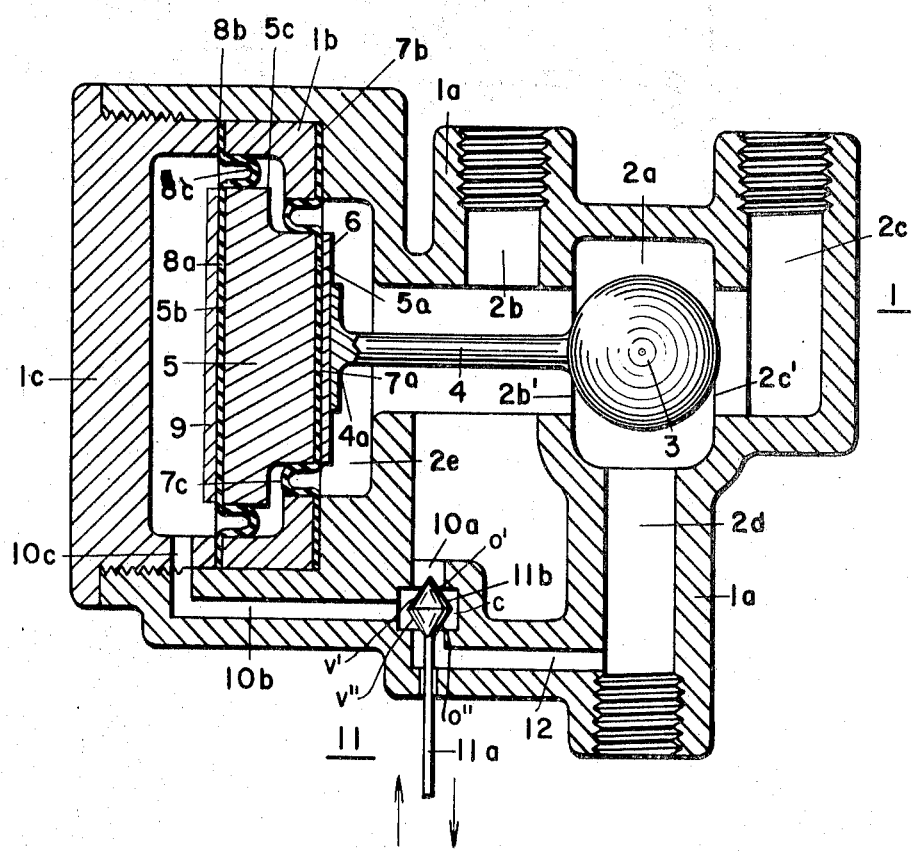

SERVO-CONTROLLED DUAL FLUID MIXING VALVE

This application is a continuation of application Ser. No. 564,383, filed Jul. 11, 1966, and now abandoned.

This invention relates generally to automated control of the flow of fluids. The term fluids as used in this context is intended to encompass both gaseous and liquid media.

In automated process controls the problem arises frequently of mixing fluids in accordance with a variable ratio, which ratio is determined by the condition of a sensing element. Such a sensing element may be responsive to temperature, pressure, flow velocity, or to any other conceivable parameter.

It is another object of this invention to provide an automatic mixing valve of utmost simplicity, capable of solving the above problem, which valve is highly reliable in its operation and inexpensive to manufacture.

Another object of this invention is to provide a dual fluid mixing valve for mixing two fluids in a variable ratio, which ratio depends upon the condition of a sensing element by which the fluid mixing valve is controlled, which mixing valve includes a movable valve element by whose movement the aforementioned ratio is changed and which valve element is operated, or actuated, by the energy inherent in one of the two fluids to be mixed.

Still another object of this invention is to provide a mixing valve having the aforementioned performance characteristics wherein the movable fluid-ratio-changing valve element is operated, or actuated, by a fluid motor of the differential piston type.

For a better understanding of the present invention together with other objects thereof reference may be had to the following description, taken in connection with the accompanying drawing, and its scope will be pointed out with particularity in the appended claims.

Referring now to the drawing which shows a vertical section of a dual fluid mixing valve embodying this invention, reference numeral 1 has been applied to generally indicate a composite fluid passageway structure, i.e. a structure comprising, or made up, of a plurality of distinct parts which define a plurality of fluid passageways. The fluid passageway structure 1 includes main casting 1a, annular insert and clamping member 1b and externally screw-threaded cover and clamping member 1c. The fluid passageway structure 1 defines a valve chamber 2a, a pair of substantially tubular fluid admission passageways 2b,2c to valve chamber 2a, each having a circular fluid admission port 2b' and 2c' to valve chamber 2a, and an outlet-passageway 2d communicating with valve chamber 2a for draining from valve chamber 2a fluid admitted to it by admission ports 2b' and 2c'. The fluid passageway structure 1 further defines a differential-pressure valve-actuator chamber 2e which communicates directly with fluid passageway 2b. Chamber 2e accommodates a differential-pressure valve actuator or fluid motor having a relatively small effective area at the left side thereof exposed to the pressure of fluid admitted from passageway 2b and having a relatively large cross-sectional area at the other side thereof, i.e. the side adjacent to cover 1c. Spherical valve element 3 is arranged inside of valve chamber 2a and operatively related by stem 4 to the aforementioned differential-pressure valve actuator or fluid motor. This actuator, or fluid motor includes a differential piston 5 having a relatively small diameter at the right end surface 5a thereof and a relatively large diameter at the left end surface thereof. The lateral wall 5c of differential piston 5 is arranged in spaced relation from the portion of passageway structure 1 defining the differential valve actuator chamber 2e. Stem 4 is arranged in coaxial relation to differential piston 5 and has a flange 4a secured to the piston 5 by fasteners, e.g. screws (not shown). Clamping plate 6 is interposed between flange 4a of stem 4 and end surface 5a of piston 5. The differential pressure valve actuator, or fluid motor, further includes a first rolling diaphragm having a radially inner circular clamping flange 7a clamped between the right side, or the right end surface, 5a of differential piston 5 and clamping plate 6. The aforementioned first rolling diaphragm further includes an annular radially outer clamping flange 7b clamped between parts 1a and 1b, and a rolling wall 7c forming a convolution intermediate clamping flanges 7a and 7b. Rolling wall 7c is arranged inside of the annular, or cylindrical, gap formed between differential piston 5 and part 1b. The differential-pressure valve actuator, or fluid motor, further includes a second rolling diaphragm having a radially inner circular clamping flange 8a clamped between the left side, or the left end surface, 5b of a differential piston 5, and a disc-shaped clamping plate 9. The aforementioned second rolling diaphragm further includes an annular radially outer flange 8b clamped between parts 1b and 1c and a rolling wall 8c forming a convolution arranged intermediate flanges 8a and 8b. Disc-shaped clamping plate 9 is secured to differential piston 5 by appropriate fastener means, e.g. by screws (not shown).

The mixing valve further includes a control duct means having three sections 10a,10b,10c connecting the right side to the left side of the valve actuator, or fluid motor, which has been described above to allow a flow of fluid under pressure from its first-mentioned to its second-mentioned side, of from its first chamber at right to its second at left, in order to build up pressure within the space, or chamber, situated to the right of cap 1c and thus to exert pressure on the left end surface 5b of differential piston 5.

The mixing valve further includes means for controlling the flow of fluid in control duct means 10a,10b,10c in order to control the pressure exerted upon the left end surface 5b of differential piston 5. These controlling means include a servovalve generally designated by reference numeral 11 having a stem 11a supporting a valve element 11b. Stem 11a and valve element 11b may be operated, i.e. selectively raised or lowered, in a direction longitudinally of stem 11a by a sensing element (not shown) which may be responsive to any conceivable operating condition such as, for instance, temperature, pressure, flow-velocity, etc. Servovalve 11 may either be directly operated by any desired sensing element, or be operated by the intermediary of conventional remote control means. If stem 11a is raised the effective cross-sectional area of valve 11 is reduced and the amount of fluid under pressure admitted to the left end surface 5b of differential piston 5 is reduced. Lowering of stem 11a of servovalve 11 has an effect opposite to that described above.

Reference numeral 12 has been applied to indicate a pressure release or venting passage for reducing the pressure at, or venting fluid under pressure from, the left end surface 5b of differential piston 5 and conduit sections 10c, 10b so as to reduce the pressure acting on the left end surface differential piston 5 whenever necessary and thus tending spherical valve element 3 to be moved by stem 4 in the direction from right to left.

It will be understood that an external duct might be substituted for the duct sections 10a, 10b, 10c defined by fluid passageway structure 1; but it is preferable to define these duct means by passageway structure 1 rather than to add to it external and separate duct means which perform the same function as duct sections 10a, 10b, 10c.

In the embodiment of the invention which has been illustrated the space to the left side of differential piston 5 is being vented into passageway 2d wherein a relatively low pressure prevails. It will be understood that the aforementioned space might be vented into any space wherein there is a relatively low pressure rather than into passageway 2d such as, for instance, to the outer atmosphere.

Valve element means 11b is in the shape of a double cone $v'$, $v''$ and has an upper limit position and a lower limit position. In the upper limit position the upper cone portion $v'$ of servovalve element means 11b abuts against the cooperating orifice $o'$ of control duct 10a and thus seals the space to the left side of the differential piston 5 completely off its source of operating pressure, i.e. passageway 2b. In the same or upper limit position of servovalve element means 11b the lower cone portion $v''$ thereof has its maximum spacing from its cooperating orifice o'' of control duct 10a. and thus the largest possible venting of the space to the left of the differential piston 5 that can be achieved in the particular structure shown is then being effected.

If servovalve element means 11b and its supporting stem 11a are in their lower limit positions. the upper cone-shaped portion v' of servovalve element means 11b is fully disengaged from its cooperating orifice o', and the effective area of admission of fluid under pressure from passageway 2b to the space. or chamber, to the left of differential piston 5 is maximized. Simultaneously the lower cone-shaped portion v' of servovalve element means 11b engages its cooperating orifice 0'' and seals the space. or chamber, to the left of differential piston 5 off venting control duct 12.

In the drawing servovalve element means 11b and its stem 11a have been shown in an intermediate position, midway between the aforementioned limit positions thereof.

Outlet passageway 2d has a predetermined straight geometrical axis, and stem 11a of servovalve 11 is arranged parallel to said geometrical axis. The axes of control ducts 10a, 12 are arranged at right angles, and fluid passageway structure 1 defines a servovalve chamber c at the region where the aforementioned axes intersect. The orifices o', o'' of control ducts 10a, 12 to servovalve chamber c are arranged in coaxial relation. Each cone-shaped portion v', v'' of valve element means 11b functions as a valve element controlling the effective area of orifices o' and o'', respectively. Valve elements v', v'' are arranged in coaxial relation to each other, and in coaxial relation to orifices o', o''.

It will be understood that the pressure prevailing in the chamber of the fluid motor to the right side of differential piston 5, acting on right side of differential piston 5 is equal to the product of pressure per unit of area, e.g. lbs/in², times the right effective area of the differential piston which area is equal to the area of the right end surface 5a of differential piston 5 plus a portion of the area of rolling wall 7c. In a similar fashion, the pressure prevailing in the left chamber of the fluid motor acting on the left side of differential piston 5 is equal to the product of pressure per unit area, e.g. lbs/in², times the left effective area of the differential piston, which area is equal to the area of the left end surface 5b of differential piston 5 plus a portion of the area of the rolling wall 8c.

Any increase of the pressure in the space, or chamber, to the left of differential piston 5 relative to that at the right of differential piston 5 resulting from a downward movement of servovalve element means 11b results in a movement of valve element 3 from left to right, thus increasing the ratio of fluid admitted from fluid passageway 2b to fluid admitted from passageway 2c to valve chamber 2a and from there to outlet passageway 2d. On the other hand, any decrease of the pressure in the space to the left of differential piston 5 relative to that at the right of differential piston 5 resulting from an upward movement of servovalve element 11b results in movement of valve element 3 from right to left, thus decreasing the ratio of fluid admitted from fluid passageway 2b and fluid admitted from passageway 2c to valve chamber 2a and from there to outlet passageway 2d.

Servovalve 11 modulates the pressure prevailing on the one side of differential piston 5 and applies the modulated pressure to the other side thereof. The pressure at one side of differential piston 5 may be referred to as supply pressure and the pressure on the other side of differential piston 5 may be referred to as servo pressure. Assuming that the effective area as defined above at the left of differential piston 5 is A and that this effective area at the right of differential piston 5 is B, and that the ratio of $$\frac{A}{B} = \frac{2}{1}$$

Assuming further that the supply pressure is 100 pressure units, then the following equation may be written $$\frac{Psu}{Pse} = \frac{100}{50}$$

wherein $Psu$ is the supply pressure and $Pse$ the servo pressure. This equation refers to the condition of balance of differential piston 5. In other words, at balance the servo pressure $Pse$ is 50 percent of the supply pressure $Psu$.

In the drawing servovalve elements v', v'' are shown in intermediate positions between their orifice-closing limit positions and their positions maximizing the effective areas of orifices o', o''. When sensor-controlled stem 11a is progressively moved upward, or downward, as the case may be, the effective areas of orifices o', o'' are simultaneously changed in opposite senses since valve elements v', v'' change the effective areas of orifices o', o'' inversely when the former are moved in the same direction.

The spherical valve element 3 and the two fluid-admission ports 2b', 2c' to valve chamber 2a and to outlet passageway 2b are, in effect, a dual valve, or two mechanically coupled valves. Spherical valve element 3 changes inversely by its movement the effective areas of fluid admission ports 2b', 2c'. It is, therefore, conceivable and possible to split spherical valve element 3 into two portions which may be semispherical, if desired, and are tied together for joint movement by a common valve stem, one of these portions controlling the effective area of port 2b', and the other of these portions controlling the effective area of port 2c'.

The fluid motor means for operating valve element 3 by the intermediary of stem 4 does not need to be a differential-piston-type fluid motor. It may be another kind of fluid motor, as long as it is operated by a fluid under pressure derived from either of the two fluid admission passageways 2b, 2c. It will be noted that valve element means 3,4 is operated in both directions by fluid pressure only, i.e. without resorting to a return spring. The differential-piston-type fluid motor compensates automatically for variations in the supply pressure that may occur in fluid admission passageway 2b inasmuch as such variations may have an effect on the operation of the fluid motor and valve element means 3,4. Among the various possible actuators, or operators, for valve element 3 and stem 4 a differential-piston-type fluid motor is the preferred actuating, or operating, means, particularly if the differential piston 5 is combined with two rolling diaphragms 7a, 7b, 7c and 8a, 8b, 8c, as shown in the appended drawing.

The term modulating as applied in this context, and as it is generally used, refers to a process involving a continuous change from zero to a maximum value. The term modulating is being used in contrast to the concept of nothing-or-all. Thus, upon lowering of stem 11a the upper cone v' of valve element means 11b increases the effective area of the port o' connecting the valve element chamber c to control duct 10a in infinitesimally small increments, or steps. Simultaneous lowering of the lower cone v'' of valve element means 11b increases the effective area of the port o'' connecting chamber c to control duct 12 in infinitesimally small increments, or steps. In the position of valve element means 11b shown in the drawing the effective areas of both ports 0', o'' are substantially equal.

Orifices 0', o'' are coaxial. This arrangement makes it possible to readily inversely control the effective areas of ducts 10a and 12b by a simple servovalve 11.

It is apparent that the fluid motor for operating parts 3,4 includes a cylinder and partition means subdividing the cylinder into two chambers of which one communicates directly with the fluid admission passageway 2b, while the other communicates through ducts 10a, 10b and 10c with passageway 2b. The partition means subdividing the cylinder of the fluid motor include piston 5 and rolling diaphragms 7a, 7b, 7c and 8a, 8b, 8c.

Considering a state of equilibrium, then there is no fluid flow in control ducts 10b and 10c. The fluid motor in a predetermined equilibrium condition, established by the position of stem 11a and valve element means 11b. If stem 11a is moved from the aforementioned equilibrium position but one increment in upward direction, a fluid flow is established out of the space of the cylinder situated in back of piston 5 through ducts 10c, 10b and 12 to passageway 2d. On the other hand, if stem 11a is moved from the aforementioned equilibrium position but one increment in downward direction, a fluid flow is established from passageway 2b through ducts 10a, 10b and 10c into the space of the cylinder situated in back of piston 5. Thus any change from equilibrium results in either instant dumping of fluid from the fluid motor, or in instant supply of fluid to the fluid motor, as the case may be. It is this particular operating characteristic which endows the structure which has been disclosed above with an uncommon speed of response. It will be understood that the system assumes a new equilibrium condition following any change in either direction. It will also be understood that I have illustrated and described herein a preferred embodiment of my invention, and that various alterations may be made therein without departing from the spirit and scope of the appended claims.

I claim:

1. A servo-controlled dual-fluid mixing valve for mixing two fluids in accordance with a variable ratio determined by the action of a sensing element including:
    a. a valve housing 1 defining a mixing chamber 2a, a first inlet passageway 2b to said mixing chamber 2a for a first fluid having a predetermined supply pressure, a second inlet passageway 2c to said mixing chamber 2a for a second fluid, and an outlet passageway 2d for draining from said mixing chamber 2a *mixtures of said first fluid and of said second fluid at a relatively low outlet passageway pressure;*
    b. a main valve stem 4 movable in a direction longitudinally thereof and supporting valve element means 3 arranged on said main valve stem 4 to inversely change the effective areas of said first inlet passageway 2b and of said second inlet passageway 2c upon movement of said main valve stem 4 in a direction longitudinally thereof;
    c. fluid motor means including a cylinder structure arranged in coaxial relation to said main valve stem 4 and a partition 5; 7a, 7b, 7c; 8a, 8b, 8c movable inside said cylinder structure integral with said main valve stem 4 and subdividing said cylinder structure into a first cylinder chamber 2e adjacent said first inlet passageway 2b and directly communicating with said first inlet passageway and a second cylinder chamber remote from said first inlet passageway 2b;
    d. means defining a control chamber and a first control duct 10b connecting said control chamber to said second cylinder chamber;
    e. means defining a second control duct 10a connecting said control chamber to said first inlet passageway 2b;
    f. means defining a third control duct 12 connecting said control chamber to said outlet passageway 2d; and
    g. a servovalve stem 11a movable in a direction longitudinally thereof and supporting servovalve element means 11b arranged on said servovalve stem 11a to inversely change the effective areas of said second control duct 10b and said third control duct 12 upon movement of said common servovalve stem 11a in a direction longitudinally thereof and to thereby vary the pressure prevailing in said control chamber and in said second cylinder chamber within a range from said supply pressure of said first fluid down to said outlet pressure of said mixture of said first fluid and said second fluid.

2. A mixing valve as specified in claim 1 wherein said movable servo element means 11b is in the form of two cones v', v'', one of said two cones v' controlling the effective area of an orifice formed between said control chamber and said second control duct 10a, and the other of said two cones v'' controlling the effective area of an orifice formed between said control chamber and said third control duct 12.

3. A mixing valve as specified in claim 1 wherein said main valve stem 4 is supported on one end thereof by said partition 5; 7a, 7b, 7c; 8a, 8b, 8c and supports said main valve element means 3 on the end thereof remote from said partition (5; 7a, 7b, 7c; 8a, 8b, 8c and wherein said main valve stem 4 is unsupported between said one end thereof and said other end thereof.

4. A mixing valve as specified in claim 1 wherein said partition is formed by a differential piston structure 5; 7a, 7b, 7c; 8a, 8b, 8c having a relatively small effective area on the side thereof adjacent said first inlet passageway 2b and a relatively large effective area at the side thereof remote from said first inlet passageway.

5. A mixing valve as specified in claim 4 wherein said differential piston structure 5; 7a, 7b, 7c; 8a, 8b, 8c includes a first rolling diaphragm 7a, 7b, 7c having a relatively small effective area situated on the side of said differential piston structure 5; 7a, 7b, 7c, 8a; 8b, 8c adjacent said first inlet passageway 2b and further includes a second rolling diaphragm 8a, 8b, 8c having a relatively large effective area situated on the side of said differential piston structure 5; 7a, 7b, 7c, 8a; 8b, 8c remote from said first passageway 2b.

6. A servo-controlled dual-fluid mixing valve for mixing two fluids in accordance with a variable ratio determined by the action of a sensing element including:
    a. a valve housing 1 defining a mixing chamber a, a first inlet passageway 2b to said mixing chamber 2a for a first fluid, a second inlet passageway 2c to said mixing chamber 2a for a second fluid, and an outlet passageway 2d for draining from said mixing chamber 2a mixtures of said first fluid and of said second fluid;
    b. a main valve stem 4 movable in a direction longitudinally thereof and supporting valve element means 3 arranged on said main valve stem 4 to inversely change the effective areas of said first inlet passageway 2b and of said second inlet passageway 2c upon movement of said main valve stem 4 in a direction longitudinally thereof;
    c. fluid motor means including a cylinder structure arranged in coaxial relation to said main valve stem 4 and a differential piston structure 5; 7a, 7b, 7c; 8a, 8b, 8c inside said cylinder structure supporting said main valve stem 4, said differential piston structure 5; 7a, 7b, 7c; 8a, 8b, 8c having a surface of relatively small effective area arranged immediately adjacent said first passageway 2b and directly exposed to said first fluid in said first passageway 2b and having a surface of relatively large effective area bounding a cylinder chamber remote from said first passageway;
    d. means defining a control chamber having two opposite end surfaces;
    e. means defining a first control duct 10b connecting said control chamber to said cylinder chamber;
    f. means defining a second control duct 10a connecting said control chamber to said first inlet passageway 2b and having a control orifice o' at one of said two opposite end surfaces of said control chamber;
    g. means defining a third control duct 12 connecting said control chamber to said outlet passageway 2d and having a control orifice o'' at the other of said two opposite end surfaces of said control chamber;
    h. a servovalve stem 11a movable in a direction longitudinally thereof arranged in coaxial relation to said control orifice o' at said one and to said control orifice o'' at said other of said two end surfaces of said control chamber; and
    i. servo element means 11b supported by said servovalve stem 11a and arranged on said servovalve stem 11a to inversely change the effective area of said control orifice o' at said one and the effective area of said control orifice o'' at said other of said two end surfaces of said control chamber.

7. a valve as specified in claim 6 wherein said differential piston 5; 7a, 7b, 7c; 8a; 8b, 8c includes a rolling diaphragm 7a, 7b, 7c of relatively small diameter and a rolling diaphragm 8a, 8b, 8c of relatively large diameter, and wherein said servo element means 11b includes two cone-shaped servovalve elements v', v''.